Patented Apr. 4, 1950

2,502,883

UNITED STATES PATENT OFFICE 2,502,883

COLOR STABILIZED ROSIN SIZE

Edward N. Poor, Stamford, and Chester G. Landes, New Canaan, Conn., assignors to American Cyanamid Company, New York, N. Y., a corporation of Maine No Drawing. Application May 12, 1948, Serial No. 26,707

9 Claims. (Cl. 106—218)

This invention relates to rosin size compositions, and more particularly to paper sizing compositions having improved color stability, and to methods of preparing the same.

Rosin sizes are usually produced by saponifying rosin with alkalies. In preparing liquid rosin sizes, the rosin is usually heated with an aqueous solution of sodium or potassium carbonate, usually employing about 9–16% of sodium carbonate based on the weight of the rosin, at about 190–212° F. for about 6 hours. In the preparation of dry rosin size the rosin is frequently reacted with about 9–12% of sodium or potassium hydroxide, in the form of a relatively concentrated aqueous solution, which produces the dry size directly. Ammonium hydroxide has also been used as a saponifying agent. Dry rosin size is also produced by subjecting the liquid size, prepared as described above, to evaporation on a drum dryer or by spray drying.

In order to avoid darkening or discoloration of the sized paper it is customary to employ a rosin which is light in color. Such light-colored rosins, known in the trade as pale rosins, are those of grade I, K, M, N, WG, WW and X, these designations corresponding to official rosin stardards that have been established by the United States Department of Agriculture. Purified rosins of this type are prepared from crude or FF rosin by solvent extraction and purification methods.

Although light-colored rosin sizes are obtained by the saponification of the lighter colored or pale grades of rosin, these sizes darken during the life of paper sized therewith. It is to this discoloration or darkening of paper sized with rosin sizes initially prepared from pale or light-colored solvent-refined rosins that the present invention is particularly directed. The color-stabilized sizes of the invention may also be used in the manufacture of industrial and household soap products, in which stability against darkening is important.

The principal object of the present invention is to improve the color stability of rosin sizes so that paper and other fibrous cellulosic materials sized therewith will have a reduced tendency to discolor or darken with heat or with time. A further object is the pretreatment of solvent-refined rosin with a class of stabilizers which will inhibit to a considerable extent the darkening of sized paper prepared therefrom, but which will produce little or no initial discoloration of the paper. A still further object is the provision of color stabilizers for rosin and rosin sizes which are relatively cheap and which are obtainable from the crude rosin itself, and are therefore of unlimited supply.

In order that those skilled in the art may have a better understanding of the materials used in practicing the invention a typical method for the recovery and purification of rosin will be described. It will be understood, however, that this description is merely illustrative of a number of solvent-refining methods that are now in commercial use for the production of solvent-refined pale rosins, and that rosin and rosin by-products from any of these methods may be used in practicing the invention.

A typical solvent extraction process for the production of pale wood rosin is described in the December 1947 issue of "Chemical Engineering," a publication of the McGraw Hill Publishing Company, Inc., New York, New York. In this process the stumps of pine trees are shredded and extracted with a solvent which is a relatively narrow petroleum fraction, having initial and final ASTM boiling points of 200° and 240° F. respectively, at a temperature between 265° and 280° F. The resulting crude solution of rosin and terpene oils is evaporated and the mixture is steam distilled under reduced pressure. The still residue is a crude or unrefined rosin product which is called FF wood rosin. Upon refining it yields, on a weight basis, 85–90% of pale rosin and 10–15% of a dark-colored materials which are known as color bodies.

In refining, the FF wood rosin is dispersed to a 50% solution in the same petroleum hydrocarbon fraction that was used in the original extraction. This solution or dispersion is diluted with additional naphtha to a 15% rosin content and is then washed with water sprays in a series of wash tanks. From the bases of these wash tanks a heavy, dark resin having a melting point of 230° F. is periodically drawn off. This dark-colored or black material is known as nigre, and constitutes about 3.5% of the FF wood rosin.

Following the removal of nigre the rosin-naptha solution is pumped over a series of adsorption columns packed with magnesium trisilicate, which removes the remaining color bodies to the desired extent. The ultimate grade of the finished pale rosin is largely dependent upon the quantity of magnesium trisilicate employed per unit of rosin solution; with the maximum quantity of adsorbent the X grade of rosin is produced. From this adsorption step the pale rosin solution is pumped into evaporators, where the solvent is removed, following which the rosin is subjected to a final fractionation for the removal of any small amounts of terpene oils that it may contain.

In order to regenerate the magnesium trisilicate for further use it is given a naphtha wash and is then washed with a stream of 95% ethanol. This solvent extracts the dark-colored impurities removed from the original rosin solution. Upon evaporation of the alcohol a dark material having a melting point of about 190° F. is obtained which is known as B-wood resin, and which is usually subjected to a final fractionation for the removal of traces of terpene oil and is then run into drums for shipment. It is used commercially in the preparation of asphalt emulsions, adhesives, varnishes, linoleum and insulating boards.

B-wood resin has been previously used for the preparation of paper sizes by saponification with sodium carbonate or sodium hydroxide where its dark color is no objection. In some cases these sizes have been extracted with hydrocarbon solvents of the type described above in order to remove as much as possible of the dark-colored material therefrom, with a corresponding increase in the color and efficiency of the size. Upon evaporation of the solvent a black residue is obtained which contains about 70% of unsaponifiable material, about 15% of natural esters and about 15% of rosin, and which upon chemical analysis shows a higher oxygen content than ordinary rosin. This black material is known to the trade under various names, but is hereinafter designated as B-wood resin size extract.

As has been stated, our present invention is directed to the problem of improving the color stability of rosin sizes prepared from pale or solvent-extracted rosins by pretreatment of the pale rosin from which the size is prepared. We have found that the dark-colored impurities removed from the rosin by solvent purification; i. e., the materials known collectively as "color bodies" and described above as nigre, B-wood resin and B-wood resin size extract, can be converted into excellent color stabilizers for pale wood rosin sizes by a heating treatment. Accordingly, our invention in its broadest aspects consists in the incorporation into pale or solvent-extracted and heat-treated wood or gum rosins, or mixtures thereof, of heat-treated color bodies, as defined above, in amounts sufficient to exert a color stabilizing action on sizes prepared therefrom, in the production of paper size of improved color stability by saponifying with alkali metal carbonate or hydroxide the rosin so treated, and in the resulting size compositions themselves.

It would ordinarily be expected that the color of paper sized with pale rosin sizes would be materially darkened by adding thereto the necessary quantities of the color bodies which were removed from the pale rosin during its purification. We have found, however, as an important feature of our invention, that such a darkening is almost completely counteracted in the sized paper by subjecting the rosin and dark-colored impurities to a heat treatment. This treatment is preferably carried out by heating the mixture in an oxygen-free atmosphere, as by maintaining a blanket of nitrogen or carbon dioxide and nitrogen, or steam, for a period of about 1–3 hours at about 250–325° C., the preferred treatment being at 300° C. for about 2 hours. Very similar results have been obtained by heating separately the color bodies and the pale rosin at the same temperatures and for the same length of time, and it will be understood that both methods of treatment are included within the scope of the invention.

The quantity of color bodies to be admixed with the pale rosin will depend to some extent on the degree of color stability desired in the finished size. A definite improvement in stability is noted when as little as 1% of the color body is incorporated, based on the weight of the mixture, while as much as 10–15% may be employed if desired. It will be understood that the color bodies, being by-products, are not all of uniform composition, and therefore it may be desirable to use larger quantities of one material than of another. Thus, for example, the darkest materials of lowest grade such as B-wood resin extract appear to be more active as color stabilizers than are the somewhat lighter-colored materials such as B-wood resin, and are therefore usually employed in somewhat smaller amounts.

The invention will be further illustrated by the following specific examples. It should be understood, however, that although these examples may describe in detail certain of the more specific features of the invention they are also to be regarded as illustrative of the quantities and types of other materials that may be used in practicing the invention.

Example 1

A uniform mixture of 500 grams of solvent refined wood rosin grade M (pale rosin) and 10 grams of B-wood resin size extract containing about 70% unsaponifiable matter plus esters and rosin acids, was heated for about 2 hours at 300° C. in an inert gas atmosphere.

A hot aqueous mixture consisting of 230 ml. of hot water and 65 grams of $Na_2CO_3$ was added to 500 grams of the above obtained treated rosin to obtain a dispersion containing 70% solid matter. This dispersion was heated in an oil bath for about 6 hours at 90–100° C., the water lost by evaporation being constantly replaced.

Sulfite pulp was beaten to a Green freeness of 350–450 cc. and to the slush pulp was added 3%, based on the weight of the dry cellulose fiber, of the above described rosin size solids in the form of an aqueous dispersion containing 5% rosin size solids. The rosin size was precipitated on the cellulose fibres by the addition to the slush stock of aluminum sulfate. Thereafter, sheets of paper were prepared on a British sheet machine and dried. The prepared paper sheets were evaluated for reflectance on a General Electric Co. recording spectrophotometer at 450 millimicrons according to standard procedure. They were then heated in an oven at 105° C. for 16 hours and again evaluated on the spectrophotometer.

Example 2

Ten grams of the B-wood resin size extract described in Example 1 was heated for about 2 hours at about 300° C. in an inert gas atmosphere. The heated material was then thoroughly mixed with 500 grams of molten solvent refined M grade wood rosin which had been similarly heat treated. The mixture was then allowed to cool.

A hot aqueous mixture consisting of 230 ml. of hot water and 65 grams of $Na_2CO_3$ was added to 500 grams of the above described heat treated rosin mixture to obtain a dispersion containing 70% solids. This dispersion was heated for about 6 hours at 90°–100° C., the water lost by evaporation being constantly replaced.

Sulfite pulp was beaten to a Green freeness of

350–450 cc. and to the slush pulp was added 3%, based on the weight of the dry cellulose fiber, of the above described rosin size solids in the form of an aqueous dispersion containing 5% rosin size solids. Thereafter, paper sheets were prepared on a British sheet machine. The paper sheets were evaluated on a General Electric Co. recording spectrophotometer, before and after aging, acording to the method of Example 1.

*Example 3*

The procedure of Example 1 was repeated except that 25 grams of the B-wood resin size extract were employed.

*Example 4*

The procedure of Example 1 was repeated except that 50 grams of the B-wood resin size extract were employed.

*Example 5*

A uniform mixture of 500 grams of solvent refined grade M wood rosin and 10 grams of nigre was heated for about 2 hours at 300° C. in an inert gas atmosphere. The heat treated mixture was thereafter converted into a sizing agent, incorporated in paper, and evaluated according to the method described in Example 1.

*Example 6*

A uniform mixture of 500 grams of solvent refined grade M wood rosin and 10 grams of furfural soluble nigre extracted from a gasoline solution of crude rosin was heated for about 2 hours at 300° C. in an inert gas atmosphere. The heat treated mixture was thereafter converted into a sizing agent, incorporated in paper, and evaluated according to the method described in Example 1.

*Example 7*

A uniform mixture of 500 grams of solvent refined grade M wood rosin and 10 grams of B-wood resin was heated for about 2 hours at 300° C. in an inert gas atmosphere. The heat treated mixture was then converted into a sizing agent, incorporated in paper, and evaluated according to the method described in Example 1.

*Example 8*

The procedure of Example 7 was repeated except that 25 grams of B-wood resin was employed.

*Example 9*

A uniform mixture of 500 grams of solvent refined grade M wood rosin and 25 grams of grade FF (crude) wood rosin was heated for about 2 hours at 300° C. in an inert gas atmosphere. The heat treated mixture was then converted into a sizing agent, incorporated in paper, and evaluated according to the method described in Example 1.

*Example 10*

The procedure of Example 9 was repeated except that 50 grams of grade FF wood rosin was employed.

The test results obtained in each of Examples 1 to 10 are listed in the following table together with three controls. Control (1) was a sample of paper prepared from the same sulfite pulp with 3% of rosin size prepared from the materials described in Example 1, but containing no stabilizer. Control (2) was a similar paper sample sized with 3% of a rosin size prepared by saponifying a uniform mixture of 98% of grade M pale rosin and 2% of B-wood resin size extract, using the procedure described in Example 1 but omitting the step of heating the mixture of rosin and extract. Control (3) was a similar sample in which the B-wood resin size extract was heated 2 hours at 300° C. but the M grade rosin was not heated. In the following table the notation "Extract" means B-wood resin extract and the heading "Color reversion" means the loss in reflectance of the paper samples caused by heating, and is a measure of the darkening to be expected during the life of the paper.

| Example No. | Color Stabilizer | Per cent Reflectance at 450 | | |
|---|---|---|---|---|
| | | Initial | After Heating | Color Reversion |
| Control (1) | None | 78.0 | 69.6 | 8.4 |
| Control (2) | 2% Extract | 76.1 | 71.1 | 5.0 |
| Control (3) | ----do---- | 77.3 | 71.6 | 5.7 |
| 1 | ----do---- | 78.0 | 73.6 | 4.4 |
| 2 | ----do---- | 79.2 | 75.1 | 4.1 |
| 3 | 5% Extract | 78.6 | 74.6 | 4.0 |
| 4 | 10% Extract | 75.7 | 72.2 | 3.5 |
| 5 | 2% Nigre | 77.5 | 73.5 | 4.0 |
| 6 | ----do---- | 77.8 | 73.7 | 4.1 |
| 7 | 2% B-Rosin | 77.4 | 72.2 | 5.2 |
| 8 | 5% B-Rosin | 76.7 | 73.0 | 3.7 |
| 9 | 5% FF-Rosin | 79.1 | 74.7 | 4.4 |
| 10 | 10% FF-Rosin | 79.4 | 74.8 | 4.6 |

What we claim is:

1. A light-colored rosin size of improved color stability consisting essentially of the product obtained by saponifying with about 9–16% of its weight of a water-soluble alkali a mixture of 85% to 99% by weight of pale rosin and 15% to 1% of wood rosin color bodies heated in an oxygen-free atmosphere at 250–325° C. for about 1 to 3 hours.

2. A light-colored rosin size of improved color stability consisting essentially of the product obtained by saponifying with about 9–16% of its weight of an alkaline alkali metal compound a mixture of 85% to 99% by weight of pale rosin and 15% to 1% of B-wood resin heated in an oxygen-free atmosphere at 250–325° C. for about 1 to 3 hours.

3. A light-colored rosin size of improved color stability consisting essentially of the product obtained by saponifying with about 9–16% of its weight of an alkaline alkali metal compound a mixture of 85% to 99% by weight of pale rosin and 15% to 1% of nigre heated in an oxygen-free atmosphere at 250–325° C. for about 1 to 3 hours.

4. A light-colored rosin size of improved color stability consisting essentially of the product obtained by saponifying with about 9–16% of its weight of an alkaline alkali metal compound a mixture of 85% to 99% by weight of pale rosin and 15% to 1% of B-wood resin extract heated in an oxygen-free atmosphere at 250–325° C. for about 1 to 3 hours.

5. A method of producing a rosin size of improved color stability which comprises saponifying a mixture of 85% to 99% of pale rosin and 15% to 1% of wood rosin color bodies heated in an oxygen-free atmosphere at 250–325° C. for 1 to 3 hours by reacting said mixture with about 9% to 16% of its weight of sodium carbonate.

6. A method of producing a rosin size of improved color stability which comprises preparing a mixture of 85% to 99% by weight of pale rosin and 15% to 1% by weight of wood rosin color bodies, heating the mixture in an oxygen-free atmosphere at a temperature within the range of 250–325° C. for about 1 to 3 hours, and then saponifying the resulting rosin product with about 9–16% of its weight of an alkaline alkali metal compound.

7. A method of producing a rosin size of improved color stability which comprises preparing a mixture of 85% to 99% by weight of pale rosin and 15% to 1% by weight of B-wood resin extract, heating the mixture in an oxygen-free atmosphere at a temperature within the range of 250–325° C. for about 1 to 3 hours, and then saponifying the product with about 9–16% of its weight of an alkaline alkali metal compound.

8. A method of producing a rosin size of improved color stability which comprises preparing a mixture of 85% to 99% by weight of pale rosin and 15% to 1% by weight of nigre, heating the mixture in an oxygen-free atmosphere at a temperature within the range of 250–325° C. for about 1 to 3 hours, and then saponifying the product with about 9–16% of its weight of an alkaline alkali metal compound.

9. A method of producing a rosin size of improved color stability which comprises preparing a mixture of 85% to 99% by weight of pale rosin and 15% to 1% by weight of B-wood resin, heating the mixture in an oxygen-free atmosphere at a temperature within the range of 250–325° C. for about 1 to 3 hours, and then saponifying the product with about 9–16% of its weight of an alkaline alkali metal compound.

EDWARD N. POOR.
CHESTER G. LANDES.

REFERENCES CITED

The following references are of record in the file of this patent:

UNITED STATES PATENTS

| Number | Name | Date |
|---|---|---|
| 1,931,226 | Humphrey | Oct. 17, 1933 |
| 2,371,884 | Gardner | Mar. 20, 1945 |